US010596870B2

United States Patent
Kimura et al.

(10) Patent No.: US 10,596,870 B2
(45) Date of Patent: Mar. 24, 2020

(54) VEHICULAR ARM COMPONENT MANUFACTURING METHOD AND VEHICULAR ARM COMPONENT

(71) Applicant: Yorozu Corporation, Yokohama (JP)

(72) Inventors: Hiroshi Kimura, Yokohama (JP); Masaharu Matsumoto, Yokohama (JP); Junichi Seki, Yokohama (JP); Tomo Tsuchida, Yokohama (JP)

(73) Assignee: Yorozu Corporation (JP)

( * ) Notice: Subject to any disclaimer, the term of this patent is extended or adjusted under 35 U.S.C. 154(b) by 621 days.

(21) Appl. No.: 15/129,629

(22) PCT Filed: Mar. 27, 2014

(86) PCT No.: PCT/JP2014/059027
§ 371 (c)(1),
(2) Date: Sep. 27, 2016

(87) PCT Pub. No.: WO2015/145701
PCT Pub. Date: Oct. 1, 2015

(65) Prior Publication Data
US 2017/0144499 A1    May 25, 2017

(51) Int. Cl.
*B60G 7/00* (2006.01)
*B21D 35/00* (2006.01)
(Continued)

(52) U.S. Cl.
CPC .............. *B60G 7/001* (2013.01); *B21D 5/01* (2013.01); *B21D 35/001* (2013.01); *B21D 53/88* (2013.01);
(Continued)

(58) Field of Classification Search
CPC ........ B21D 37/08; B21D 22/24; B21D 22/26; B21D 24/005; B21D 5/01; B21D 53/88; B60G 2206/8102; B60G 2206/8103
(Continued)

(56) References Cited

U.S. PATENT DOCUMENTS 501,900 A * 7/1893 Singer ...................... B21D 5/02
72/379.2
977,118 A * 11/1910 Minshull ............. B21C 37/0822
72/379.2

(Continued)

FOREIGN PATENT DOCUMENTS

CN        1137983 A       12/1996
DE    102008015393 A1 *   9/2009   ............. B21D 37/08
(Continued)

OTHER PUBLICATIONS

Machine Translation of DE 10 2008 015 393, Translated Mar. 8, 2019, 3 Pages (Year: 2009).*
(Continued)

*Primary Examiner* — Gregory D Swiatocha
(74) *Attorney, Agent, or Firm* — Drinker Biddle & Reath LLP

(57) ABSTRACT

Method of manufacturing a vehicular arm component having a particular torsional rigidity and a sufficient tensile strength. Method of manufacturing a vehicular arm component 1 having a hollow shape in open cross-section by subjecting workpiece W, which is a flat plate, extending in an XY plane to pressing in stages such that two side surfaces W1, W2 of the workpiece in an XZ plane formed by the X direction and a Z direction face one another across a gap G, the method including a restriking process in which a protrusion 113 disposed on a restriking die 110 to be extended in the X direction is arranged in the gap between the two side surfaces facing one another and the two side surfaces are (Continued)

brought into contact with the protrusion such that the workpiece is pressed from an outer periphery to an inner periphery.

6 Claims, 16 Drawing Sheets

(51) Int. Cl.
*B21D 5/01* (2006.01)
*B21D 53/88* (2006.01)

(52) U.S. Cl.
CPC .... *B60G 2206/012* (2013.01); *B60G 2206/11* (2013.01); *B60G 2206/811* (2013.01); *B60G 2206/8102* (2013.01); *B60G 2206/8103* (2013.01); *B60G 2206/84* (2013.01)

(58) Field of Classification Search
USPC ........................................ 72/379.2
See application file for complete search history.

(56) References Cited

U.S. PATENT DOCUMENTS

| | | | | |
|---|---|---|---|---|
| 4,860,570 | A * | 8/1989 | Perrault | B21D 53/24 72/379.2 |
| 5,662,348 | A | 9/1997 | Kusama et al. | |
| 6,241,267 | B1 | 6/2001 | Dziadosz et al. | |
| 6,609,285 | B1 * | 8/2003 | Kinney | B21D 39/02 29/407.05 |
| 8,291,595 | B2 * | 10/2012 | Runte | B21D 53/88 29/897.2 |
| 8,365,411 | B2 * | 2/2013 | Saito | B21D 5/015 29/897.2 |
| 8,752,850 | B2 | 6/2014 | Ueno et al. | |
| 9,452,650 | B2 | 9/2016 | Matsumoto et al. | |
| 2001/0013242 | A1 * | 8/2001 | Kondou | B21C 37/104 72/379.2 |
| 2002/0162297 | A1 * | 11/2002 | Graber | B21D 53/84 296/146.6 |
| 2005/0257591 | A1 | 11/2005 | Hauger et al. | |
| 2015/0224842 | A1 | 8/2015 | Matsumoto et al. | |

FOREIGN PATENT DOCUMENTS

| | | |
|---|---|---|
| EP | 0733499 A1 | 9/1996 |
| JP | 2004533355 A | 11/2004 |
| JP | 2005297064 A | 10/2005 |
| JP | 2007118087 A | 5/2007 |
| JP | 2010126095 A | 6/2010 |
| JP | 2011104623 A | 6/2011 |
| JP | 2012115905 A | 6/2012 |
| JP | 2012188076 A | 10/2012 |
| JP | 2013159140 A | 8/2013 |
| WO | WO-2007033499 A1 | 3/2007 |
| WO | WO-2014033933 A1 | 3/2014 |
| WO | WO-2014034885 A1 | 3/2014 |

OTHER PUBLICATIONS

Supplementary European Search Report for Application No. EP 14 88 6959.
International Preliminary Report on Patentability with English Translation for Application No. PCT/JP2014/059027, dated Sep. 27, 2016.
International Search Report (English translation) for PCT/JP2014/059027 dated Jun. 10, 2014.
International Search Report (in Japanese) with Written Opinion of the International Search Authority for PCT/JP2014/059027 dated Jun. 10, 2014.
Japanese Office Action for Japanese Patent Application No. 2016-509782 with English Translation, dated Jan. 23, 2018.

* cited by examiner

VEHICULAR ARM COMPONENT MANUFACTURING METHOD AND VEHICULAR ARM COMPONENT

CROSS-REFERENCE TO RELATED APPLICATIONS

This application is a national stage application (under 35 U.S.C. § 371) of PCT/JP2014/059027, filed Mar. 27, 2014, which is incorporated herein by reference in its entirety.

TECHNICAL FIELD

The present invention relates to a method of manufacturing a vehicular arm component and a vehicular arm component.

BACKGROUND ART

Examples of a vehicular arm component include a suspension arm which connects a vehicle body and a wheel and a radius rod which connects a subframe and the wheel. Such a vehicular arm component is required to nave a sufficient tensile strength in order to oppose a large tensile force applied during running or braking of the vehicle.

It is desired to increase ride comfortableness by avoiding (releasing) oscillations by preventing direct transmission of the oscillations during external force input to a driver while the above condition is satisfied. In order to avoid oscillations, it is necessary to absorb oscillations with a vehicular arm component by increasing the amount of displacement of (by deflecting) the vehicular arm component during external input. It is important to properly reduce the rigidity of the vehicular arm component.

In order to reduce the rigidity, it is effective to reduce the material thickness of the vehicular arm component or that a shaft portion of the vehicular arm component has an open cross-section. For example, Patent Literature 1 below discloses a suspension arm in which an axially formed opening is provided in a part in the circumferential direction. With the suspension arm configured in the above manner, the shaft portion of the vehicular arm component has an open cross-sectional shape. Therefore, the torsional rigidity can be reduced. Thus, the amount of displacement of the suspension arm during external input can be increased, enabling avoidance of oscillations during external input, thereby increasing the ride comfortableness.

CITATION LIST

Patent Literature

Patent Literature 1: JP 2013-159140 A

SUMMARY OF INVENTION

Technical Problem

However, regarding the suspension arm described in Patent Literature 1, the tensile strength depends on the natural tensile strength of the material. For an increased tensile strength, the material thickness must be increased, resulting in increases in weight and manufacturing costs.

The present invention has been made to solve the aforementioned problem, and it is an object of the present invention to provide a method of manufacturing a vehicular arm component which has a torsional rigidity of a predetermined level or less and has an increased tensile strength without an increased material thickness, and a vehicular arm component.

Solution to Problem

A method of manufacturing a vehicular arm component according to the present invention that achieves the aforementioned problem is the method of manufacturing the vehicular arm component for manufacturing the vehicular arm component having a hollow shape in open cross-section by subjecting a workpiece, which is a flat plate, extending in a first plane formed by a first direction and a second direction perpendicular to the first direction to pressing in stages such that two side surfaces of the workpiece in a second plane formed by the first direction and a third direction perpendicular to the first plane face one another across a gap, the method including a restriking process in which a protrusion disposed on a restriking die to be extended in the first direction is arranged in the gap between the two side surfaces facing one another and the two side surfaces are brought into contact with the protrusion such that the workpiece is pressed from an outer periphery to an inner periphery.

Advantageous Effect of Invention

Since the vehicular arm component manufactured by the aforementioned vehicular arm component manufacturing method has a hollow shape in open cross-section, the torsional rigidity can be reduced to a predetermined level or less. Furthermore, since a protrusion is arranged in a gap between two side surfaces and the two side surfaces are brought into contact with the protrusion such that a workpiece is pressed from the outer periphery to the inner periphery, a compression load can be uniformly applied to the workpiece in the circumferential direction. Thus, the material is compressed in the circumferential direction, and work hardening uniformly occurs in the circumferential direction. Thus, a tensile strength equal to or greater than the tensile strength of the material can be obtained in the entire circumferential direction. Thus, the tensile strength can be increased without an increase in material thickness. Accordingly, a vehicular arm component which has a torsional rigidity of a predetermined level or less and has an increased tensile strength without an increased material thickness can be provided.

DESCRIPTION OF EMBODIMENTS

An embodiment of the present invention is described with reference to the drawings. In the present embodiment, an arrangement surface on which a flat plate is arranged is assumed to be an XY plane, a direction in which the flat plate is extended is assumed to be an X direction (first direction), a direction perpendicular to the X direction in the arrangement surface is assumed to be a Y direction (second direction), and a direction perpendicular to the XY plane is assumed to be a Z direction (third direction).

Figure 1:
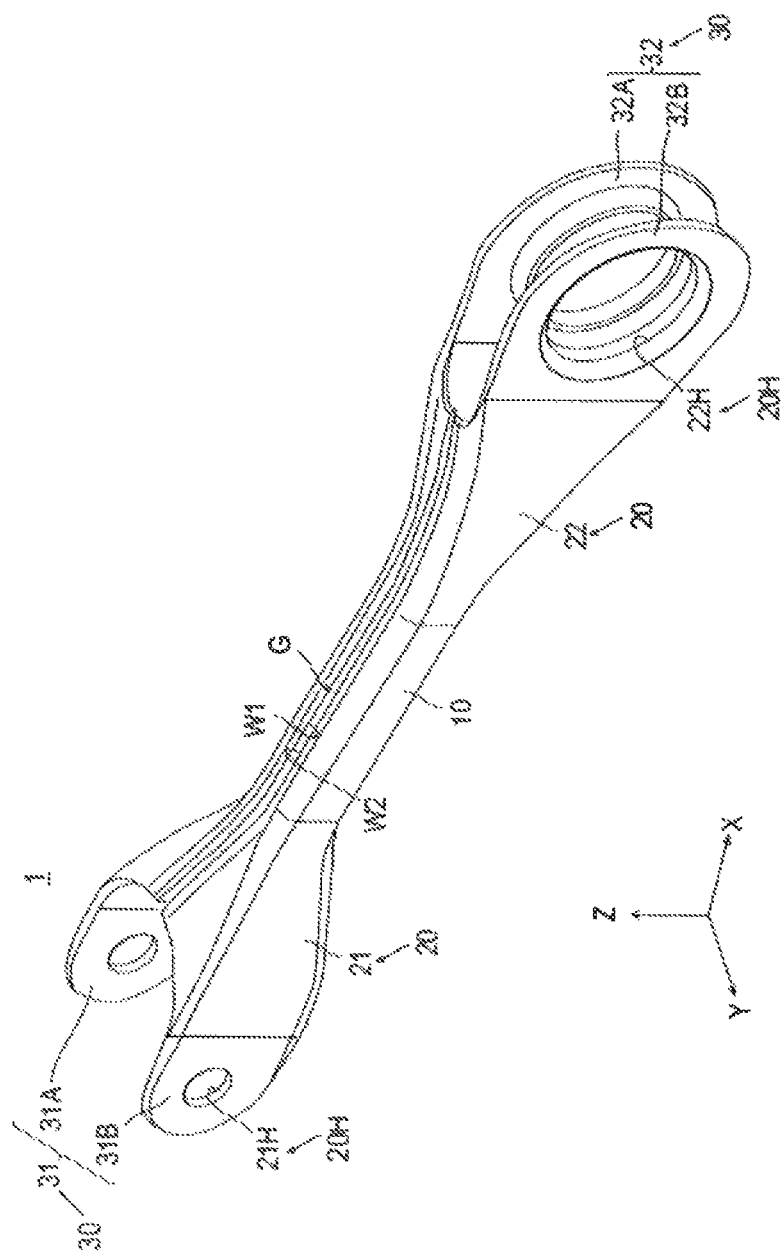
FIG. 1 is a perspective view illustrating a suspension arm according to an embodiment of the present invention.
Figure 2A:
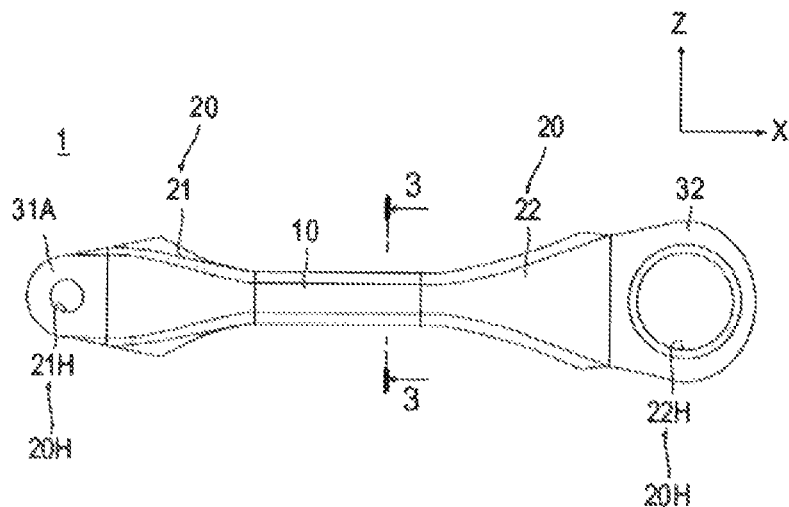
FIG. 2(A) is a front view illustrating a suspension arm
Figure 2B:
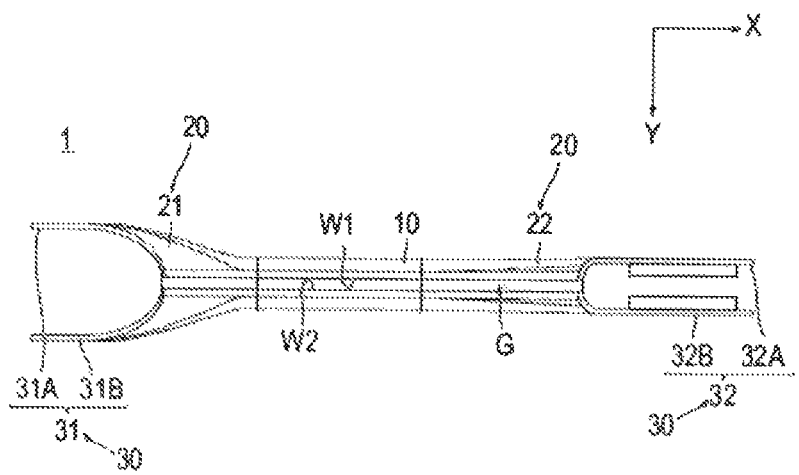
FIG. 2(B) is a top view illustrating a suspension arm.
Figure 3:
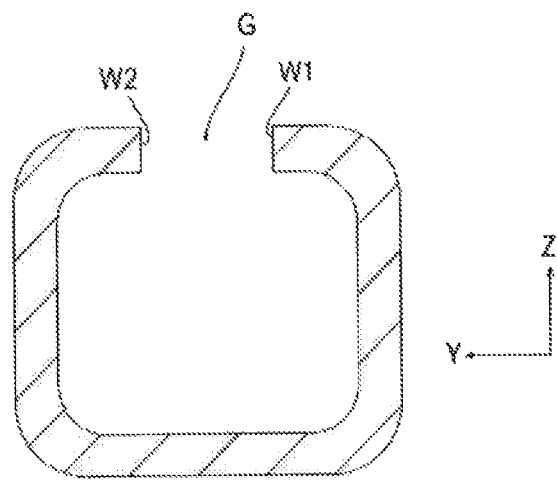
FIG. 3 is a cross-sectional view along line 3-3 of FIG. 2.

FIG. 1 is a perspective view illustrating a suspension arm 1 according to the embodiment of the present invention. FIG. 2(A) is a front view illustrating the suspension arm 1. FIG. 2(B) is a top view illustrating the suspension arm 1. FIG. 3 is a cross-sectional view along line 3-3 of FIG. 2.

As illustrated in FIG. 1, the vehicular arm component according to the embodiment of the present invention is used for the suspension arm 1 for a vehicle. The vehicular arm component is the suspension arm 1 having a hollow shape in open cross-section from one end to the other end in the X direction manufactured by subjecting a workpiece W, which is a flat plate, extending in the XY plane formed by the X direction and the Y direction to pressing in stages such that two side surfaces W1, W2 of the workpiece W in the XZ, plane face one another across a gap G.

As illustrated in FIG. 1 to 3, the suspension arm 1 includes a middle portion 10 disposed near the middle in the direction, bracket portions 20 disposed at both ends of the middle portion 10 in the X direction, the outer periphery and the inner periphery being expanded outward in the X direction, and two plate portions (coupling portions) 30 disposed on the bracket portions 20 to face one another in the Y direction in the shape of a plate, the plate portions 30 being formed with through-holes 20H in positions facing one another in the Y direction. The middle portion 10, the bracket portions 20, and the two plate portions 30 are formed in one piece.

The middle portion 10 is disposed near the middle in the X direction. As illustrated in FIG. 3, the middle portion 10 has a hollow shape in open cross-section with a gap G formed at an upper part. The two side surfaces W1, W2 face one another across the gap G. Incidentally, the cross-sectional shape of the middle portion 10 is not limited to a rectangular shape, but may be a circular shape.

In FIG. 2, the bracket portion 20 includes a first bracket portion 21 disposed on a left end of the middle portion 10 and a second bracket portion 22 disposed on a right end of the middle portion 10.

As illustrated in FIGS. 2(A) and 2(B), the first bracket portion 21 has increased outer periphery and inner periphery in the Y direction and in the Z direction leftward in the X direction. The second bracket portion 22 has increased outer periphery and if inner periphery only in the S direction rightward in the X direction. Incidentally, the configuration of the bracket portion 20 is not subjected to any limitations insofar as the bracket portion 20 is extended outward in the X direction.

The plate portion 30 includes a first plate portion 31 disposed on a left end of the first bracket portion 21 and a second plate portion 32 disposed on a right end of the second bracket portion 22.

The first plate portion 31 includes two plates 31A, 31B, which are disposed to face one another in the Y direction and are formed with first through-holes 21H in positions facing one another in the Y direction.

The second plate portion 32 includes two plates 32A, 32B, which are disposed to face one another in the Y direction and are formed with second through-holes 22H in positions facing one another in the Y direction. The second through-hole 22H is formed by burring directed inward in the Y direction.

The hole diameter of the first through-hole 21H is formed to be smaller than the hole diameter of the second through-hole 22H.

The first through-hole 21H is coupled to a wheel (not illustrated) with a nut (not illustrated) by a bolt (not illustrated) inserted therein from a side near the wheel.

The second through-hole 22H is provided with a bushing press-fitted therein and is coupled to a shaft member (not illustrated) protruding from a vehicle body across an elastic member, e.g., a rubber.

Next, the method of manufacturing the suspension arm 1 according to the present embodiment is described.

Figure 4:
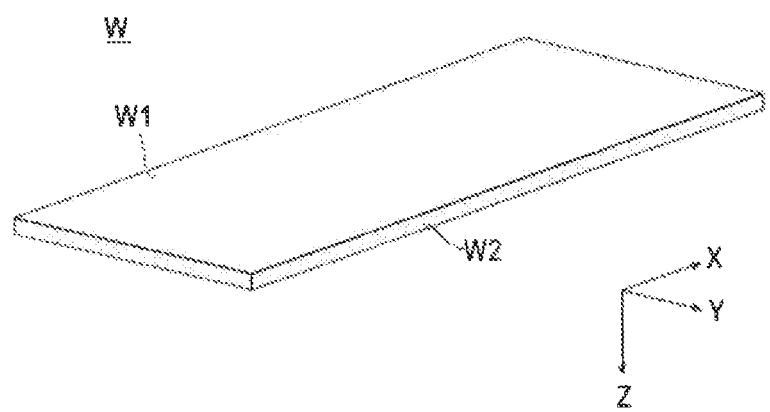
FIG. 4 is a perspective view illustrating a workpiece, which is a flat plate, prior to pressing of a suspension arm according to the present embodiment.

FIG. 4 is a view illustrating a workpiece W, which is a metallic flat plate, prior to pressing of the suspension arm 1 according to the present embodiment.

First, unnecessary portions of the workpiece W are trimmed at both ends in the Y direction so that a portion near the middle in the X direction is narrowed and the width is increased outward in the X direction (trimming process).

Figure 5:
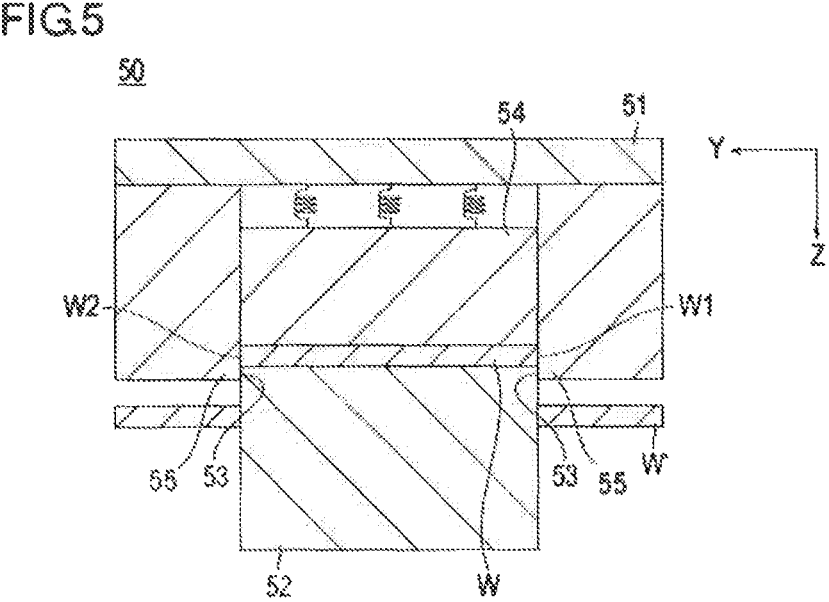
FIG. 5 is a view illustrating a trimming process of the method of manufacturing a suspension arm according to the present embodiment.
Figure 6:
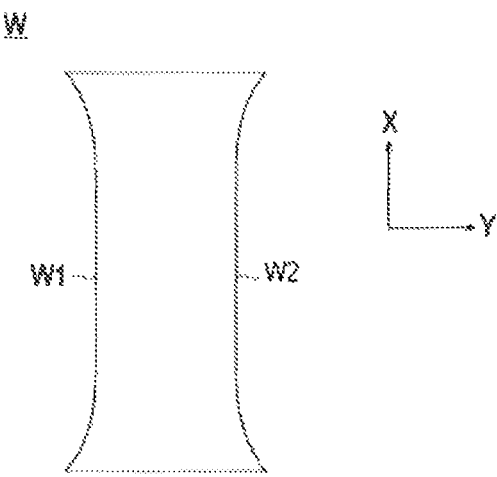
FIG. 6 is a per view of a workplace when the trimming process is completed.

FIG. 5 is a view illustrating the trimming process of the method of manufacturing the suspension arm 1 according to the present embodiment. FIG. 6 is a top view of the workpiece W when the trimming process is completed.

As illustrated in FIG. 5, the workpiece W, which is a flat plate, is trimmed by a first forming die 50. The first forming die 50 includes a first upper die 51 and a first lower die 52. The first lower die 52 includes lower die cutting blades 53 at the outer peripheral end of the surface facing the first upper die 51. The first upper die 51 includes a holder portion 54 which is disposed opposite the first lower die 52 and is provided with springs on the back surface. The holder portion 54 is biased toward the second lower die 52. The first upper die 51 also includes upper die cutting blades 55 which are disposed on the outer periphery of the holder portion 54 and is paired with the lower die cutting blade 53.

In the trimming process, first, the workpiece W, which is a flat plate, is placed, and the first, upper die 51 and the first lower die 52 are brought close to one another. When the workpiece W is held between the holder portion 54 of the first upper die 51 and the second lower die 52, the holder portion 54 is retracted by being biased with the springs. When the holder portion 54 is retracted, the workplace W is held between the upper die cutting blades 55 and the lower die cutting blades 53. As illustrated in FIG. 5, an outer peripheral portion W' of the workpiece W is cut off. Then, when the first upper die 51 and the first lower die 52 are separated, the workpiece W is taken out of the first upper die 51 by a repulsive force of the springs.

In this way, in the trimming process, as illustrated in FIG. 6, the unnecessary portions of the workpiece W are trimmed, and the two side surfaces W1, W2 are formed in the Y direction.

Next, the workpiece W is pressed such that, in the YZ plane, while a base portion B with a predetermined width remains near the middle in the Y direction, a pair of first extensions E1 which are extended downward (Z direction) away from one another from both ends of the base portion B, a pair of second extensions E2 which are extended upward away from one another from the ends of the first extensions E1 opposite to the ends where the base portion B is disposed, and a pair of flange portions T which are extended outward in the Y direction away from one another from the ends of the second extensions E2 opposite to the ends where the first extensions E1 are disposed are formed (forming process).

Figure 7:
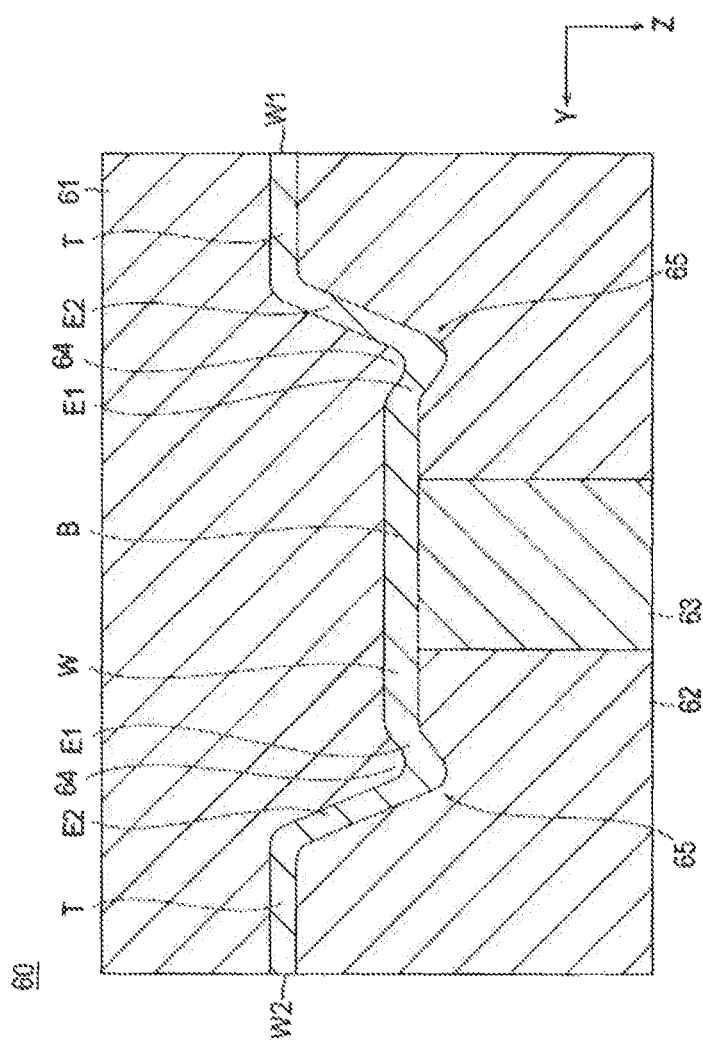
FIG. 7 is a cross-sectional view perpendicular to the X axis, illustrating a forming process of the method of manufacturing a suspension arm according to the present embodiment.

FIG. 7 is a cross-sectional view perpendicular to the X axis, illustrating the forming process of the method of manufacturing the suspension arm 1 according to the present embodiment.

As illustrated in FIG. 7, the workpiece W trimmed by the first forming die 50 is provided with the first extensions E1, the second extensions E2, and the flange portions T by a second forming die 60. The second forming die 60 includes a second upper die 61, a second lower die 62 disposed opposite the first upper die 61, and a projecting portion 63. The second upper die 61 is provided with two convex portions 64 protruding toward the second lower die 62. The second lower die 62 is provided with two groove portions 65 recessed corresponding to the two convex portions 64 of the second upper die 61.

In the forming process, first, the trimmed workpiece W is placed in the second forming die 60, and the second upper die 61 is brought close to the second lower die 62. Thus, on the basis of the two convex portions 64 of the second upper die 61 and the two groove portions 65 of the second lower die 62, the workpiece W is provided with the pair of first extensions E1, the pair of second extensions E2, and the pair of flange portions T while the base portion B is remains. Furthermore, the workpiece W shaped by the second forming die 60 is protruded by the projecting portion 63.

Next, the second extensions E1 of the workpiece W provided with the first extensions E1, the second extensions E1 and the flange portions T in the forming process are bent in the direction in which the first extensions E1 are extended, and the flange portions T are bent downward (Z direction) (preliminary process).

FIG. 3 is a cross-sectional view perpendicular to the X axis, illustrating the preliminary process of the method of manufacturing the suspension arm 1 according to the present embodiment.

Figure 8:
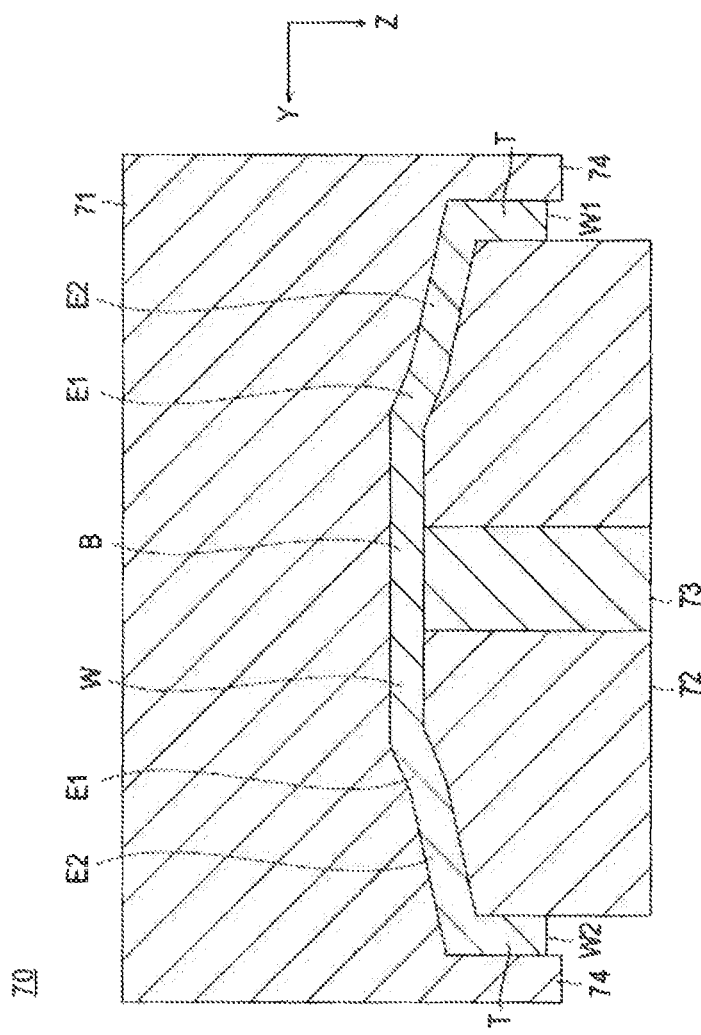
FIG. 8 is a cross-sectional view perpendicular to the X axis, illustrating a preliminary process of the method of manufacturing a suspension arm according to the present embodiment.

In the forming process, as illustrated in FIG. 8, the workpiece W pressed by the second forming die 60 is subjected to the preliminary process by a third forming die 70. The third forming die 70 includes a third upper die 71, a third lower die 72 disposed opposite the third upper die 71, and a projecting portion 73. Convex portions 74 protruding downward in the direction are formed at both ends of the third upper die 71 in the Y direction.

In the preliminary process, first, the workpiece W is placed in the third forming die 70, and the third upper die 71 is brought close to the third lower die 72. Thus, the second extensions E2 of the workpiece W are bent in the direction in which the first extensions E1 are extended and the flange portions T are bent downward on the basis of the shape of the third upper die 71. Furthermore, the workpiece W shaped by the third forming die 70 is protruded by the projecting portion 73.

Next, the second extensions E2 of the workpiece W pressed in, the preliminary process are bent to be substantially parallel to the first extensions E1, and the first extensions E1 and the second extensions E2 are bent downward so that the flange portions T face one another (bending process).

The bending process includes a first bending process, a second bending process, and a third bending process as described below.

In the first bending process, the second extensions E2 of the workpiece W pressed in the preliminary process are bent to be substantially parallel to the first extensions E1, and the first extensions E1 and the second extensions E2 are bent to 45 degrees relative to the base portion B.

Figure 9:
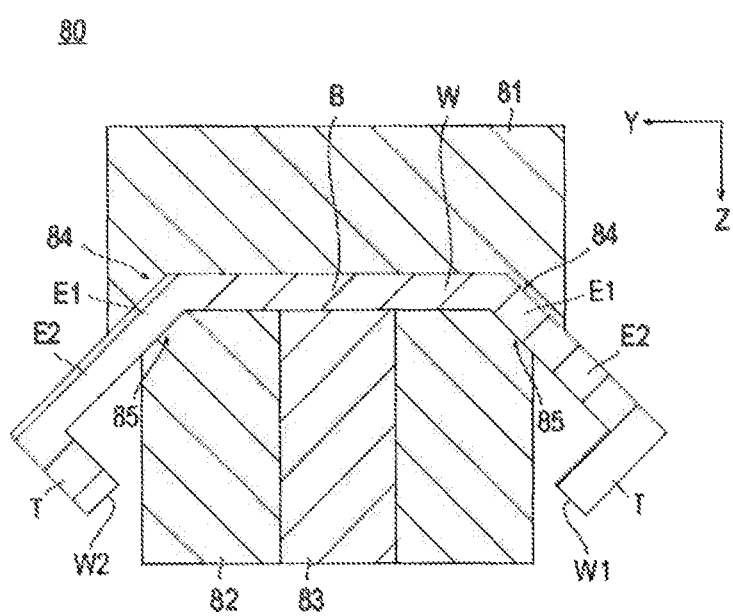
FIG. 9 is a cross-sectional view perpendicular to the X axis, illustrating a first bending process of the method of manufacturing a suspension arm according to the present embodiment.

FIG. 9 is a cross-sectional view perpendicular to the X axis, illustrating the first bending process of the method of manufacturing the suspension arm 1 according to the present embodiment.

In the preliminary process, as illustrated in FIG. 9, the workpiece W pressed by the third forming die 70 is subjected to the first bending process by a fourth forming die 80. The fourth forming die 80 includes a fourth upper die 81, a fourth lower die 82 disposed opposite the fourth upper die 81, and a projecting portion 83. The fourth upper die 81 includes upper die tapered portions 84 which are inclined 45 degrees relative to the Y direction, and the fourth lower die 82 includes lower die tapered portions 85 which are inclined according to the upper die tapered portions 84. Furthermore, the upper die tapered portions 84 are extended to cover the first extensions E1 and the second extensions E2.

In the first bending process, first, the workpiece W is placed in the fourth forming die 80, and the fourth upper die 81 is brought close to the fourth lower die 82. Thus, the second extensions E2 are bent to be substantially parallel to the first extensions E1, and the first extensions E1 and the second extensions E2 are bent to have an inclination of 45 degrees relative to the base portion B. Furthermore, the workpiece W shaped by the fourth forming die 80 is protruded by the projecting portion 83.

Next, the first extensions E1 and the second extensions E2 of the workplace W pressed in the first bending process are bent to have an inclination of 70 degrees relative to the base portion B (second bending process).

Figure 10:
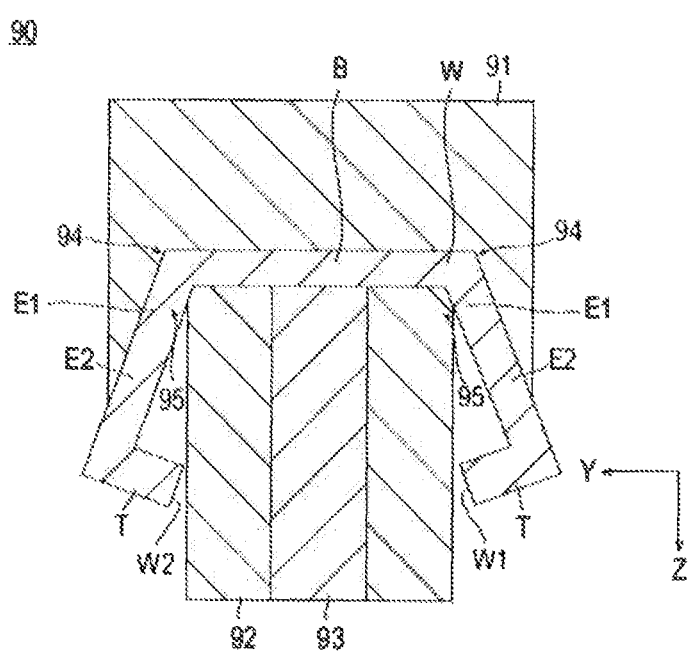
FIG. 10 is cross-sectional view perpendicular to the X axis, illustrating a second bending process of the method of manufacturing a suspension arm according to the present embodiment.

FIG. 10 is a cross-sectional view perpendicular to the X axis, illustrating the second bending process of the method of manufacturing the suspension arm 1 according to the present embodiment.

In the first bending process, as illustrated in FIG. 10, the workpiece W pressed by the fourth forming die 80 is subjected to the second bending process by a fifth forming die 90. The fifth forming die 90 includes a fifth upper die 91, a fifth lower die 92 disposed opposite the fifth upper die 91, and a projecting portion 93. The fifth upper die 91 includes upper die tapered portions 94 which are inclined 70 degrees relative to the Y direction, and the fifth lower die 92 includes lower die tapered portions 95 which are inclined according to the upper die tapered portions 94. Furthermore, the upper die tapered portions are extended to cover the first extensions E1 and the second extensions E2.

In the second bending process, first, the workpiece W is placed in the fifth forming die 90, and the fifth upper die 91 is brought close to the fifth lower die 92. Thus, the first extensions E1 and the second extensions 52 are bent to have an inclination of 70 degrees relative to the base portion B. Furthermore, the workpiece W shaped by the fifth forming die 90 is protruded by the protecting portion 93.

Next, the first extensions E1 and the second extensions E2 of the workplace W pressed in the second bending process are bent to have an inclination of 90 degrees relative to the base portion B, i.e., bent downward in the Z direction (third bending process).

Figure 11:
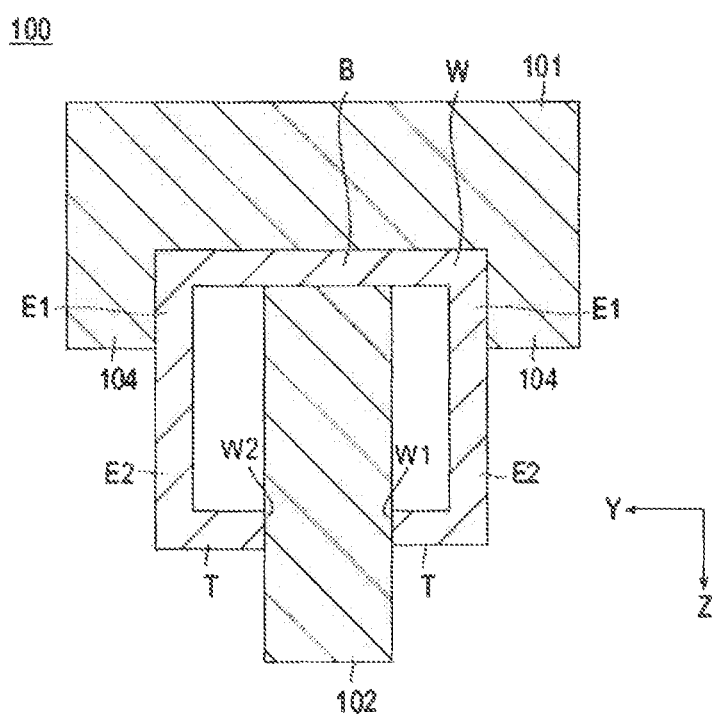
FIG. 11 is a cross-sectional view perpendicular to the X axis, illustrating a third bending process of the method of manufacturing a suspension arm according to the present embodiment.

FIG. 11 is a cross-sectional view perpendicular to the X axis, illustrating the third bending process of the method of manufacturing the suspension arm 1 according to the present embodiment.

In the second bending process, as illustrated in FIG. 11, the workpiece W pressed by the fifth forming die 90 is subjected to the third bending process by a sixth forming die 100. The sixth forming die 100 includes a sixth upper die 101 and a sixth lower die 102 disposed opposite the sixth upper die 101. The sixth upper die 101 includes convex portions 104 protruding downward in the Z direction. The convex portions 104 are extended to cover the first extensions E1 and the second extensions E2.

In the third bending process, first, the workpiece W is placed in the sixth forming die 100, and the sixth upper die 101 is brought close to the sixth lower die 102. Thus, the first extensions E1 and the second extensions E2 are bent to have an inclination of 90 degrees relative to the base portion B. In other words, the first extensions E1 and the second extensions E2 face downward in the Z direction, so that the flange portions T face one another.

Next, a protrusion 113 formed on a seventh forming die (restriking die) 110 to be extended in the X direction is arranged in the gap G between the two side surfaces W1, W2 of the workpiece W pressed in the third bending process, and the two side surfaces W1, W2 are brought into contact with the protrusion 113 so that the workpiece W is pressed from the outer periphery to the inner periphery (restriking process).

Figure 12:
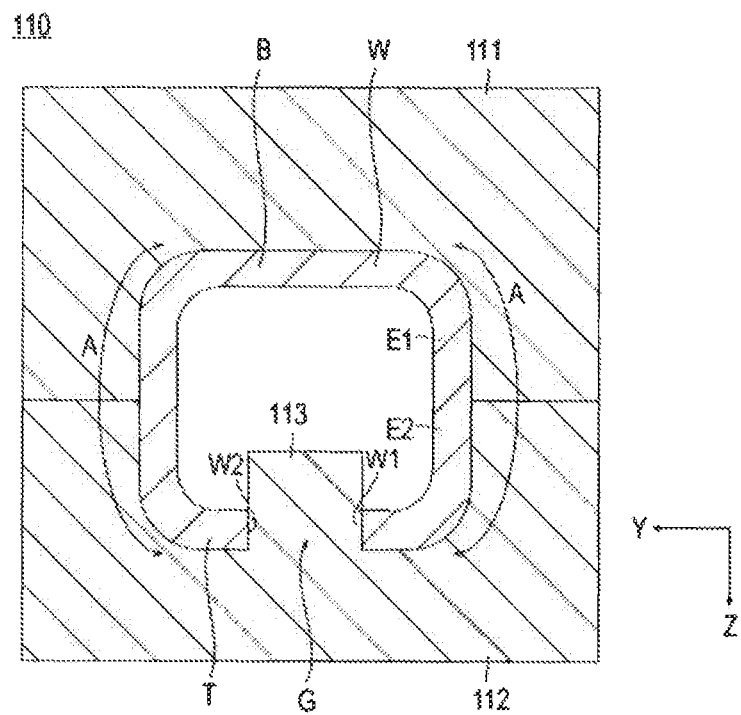
FIG. 12 is a cross-sectional view perpendicular to the X axis, illustrating a restriking process of the method of manufacturing a suspension arm according to the present embodiment.
Figure 13:
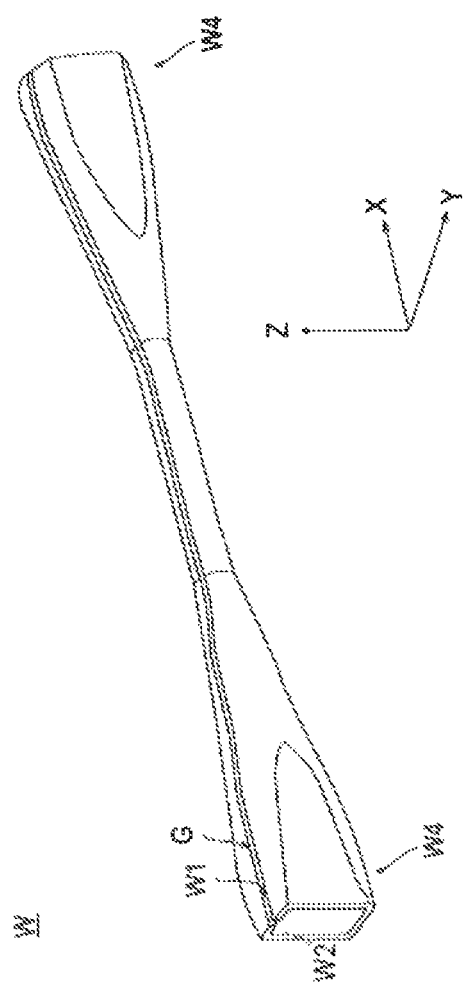
FIG. 13 is a perspective view of a work piece when the restriking process is completed.

FIG. 12 is a cross-sectional view perpendicular to the X axis, illustrating the restriking process of the method of manufacturing the suspension arm 1 according to the present embodiment, FIG. 13 is a perspective view of the workpiece W when the restriking process is completed wherein the gap G is located at an upper part.

In the third bending process, as illustrated in FIG. 12, the workpiece W pressed by the sixth forming die 100 is subjected to the restriking process by the seventh forming die 110. The seventh forming die 110 includes a seventh upper die 111 and a seventh lower die 112 disposed opposite the seventh upper die 111. The seventh lower die 112 includes the protrusion 113 formed extending in the X direction. The width of the protrusion 113 in the Y direction is set to be smaller than the gap between the two side surfaces W1, W2 of the workpiece W shaped in the third bending process. Furthermore, the protrusion 113 is formed to have a distance equal to or greater than the distance of the X-directional gap G extending in the X direction.

In the restriking process, first, the workpiece W is placed in the seventh forming die 110, and the seventh upper die 111 is brought close to the seventh lower die 112. Thus, the two side surfaces W1, W2 are brought into contact with the protrusion 113, and the workpiece W is pressed from the outer periphery to the inner periphery. In this way, a compression load is uniformly applied to the workpiece in the circumferential direction (see arrow A). Thus, the material is compressed in the circumferential direction, and work hardening uniformly occurs in the circumferential direction. Thus, a sufficient tensile strength is obtained in the circumferential direction.

In such a restriking process, as illustrated in FIG. 13, a hollow shape in open cross-section is formed in which the two side surfaces W1, W2 of the workpiece W face one another across the gap G. Furthermore, since the protrusion 113 is formed to have a distance equal to or greater than the distance of the X-directional cap G extending in the X direction, a hollow shape in open cross-section from one end to the other end in the X direction is formed.

Next, parts F1, F2 of the two side portions in the Z direction formed at both ends in the X direction are cut (cutting process).

Figure 14:
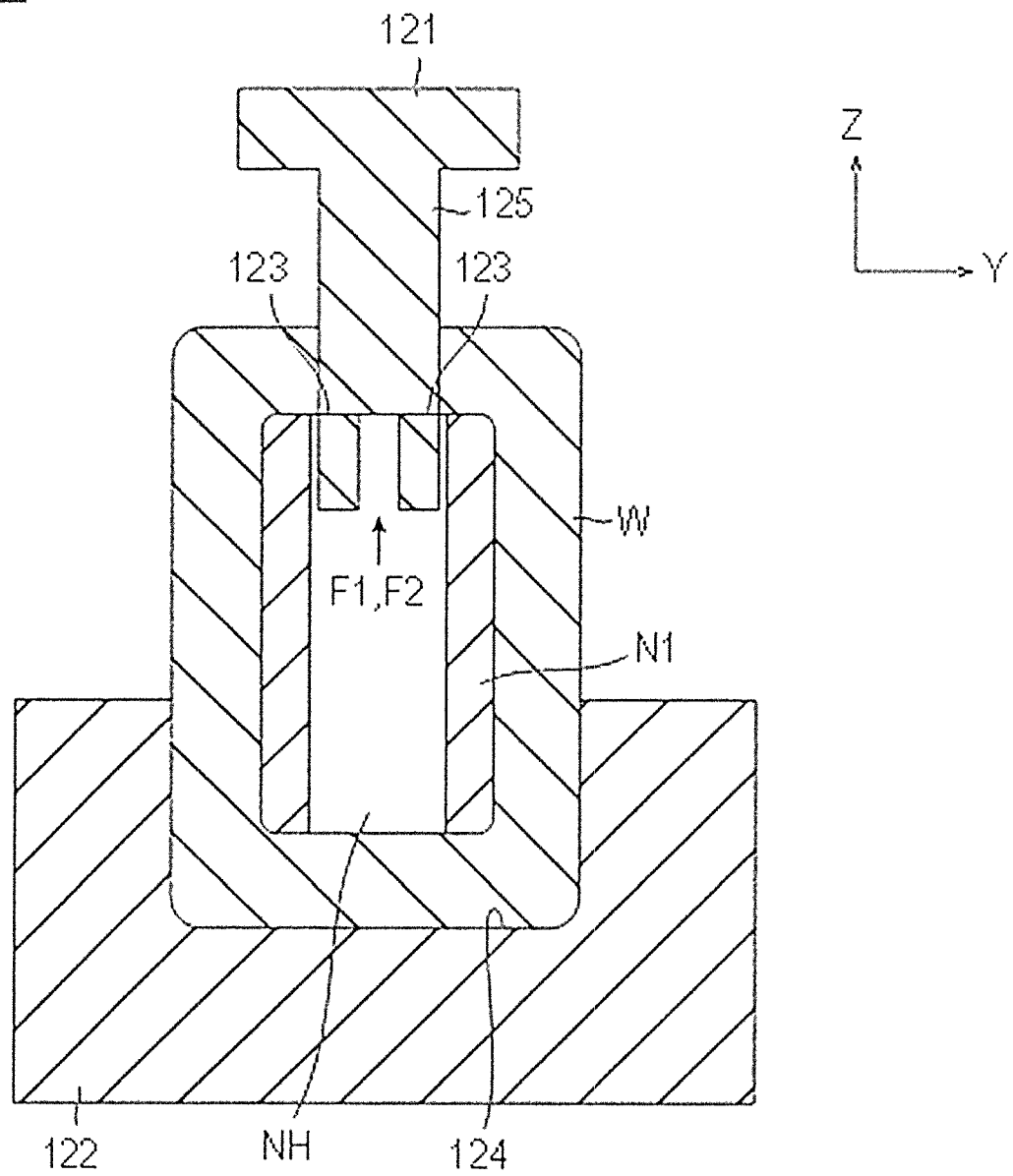
FIG. 14 is a cross-sectional view of both ends in the X direction perpendicular to the X axis, illustrating a cutting process of the method of manufacturing a suspension arm according to the present embodiment.
Figure 16:
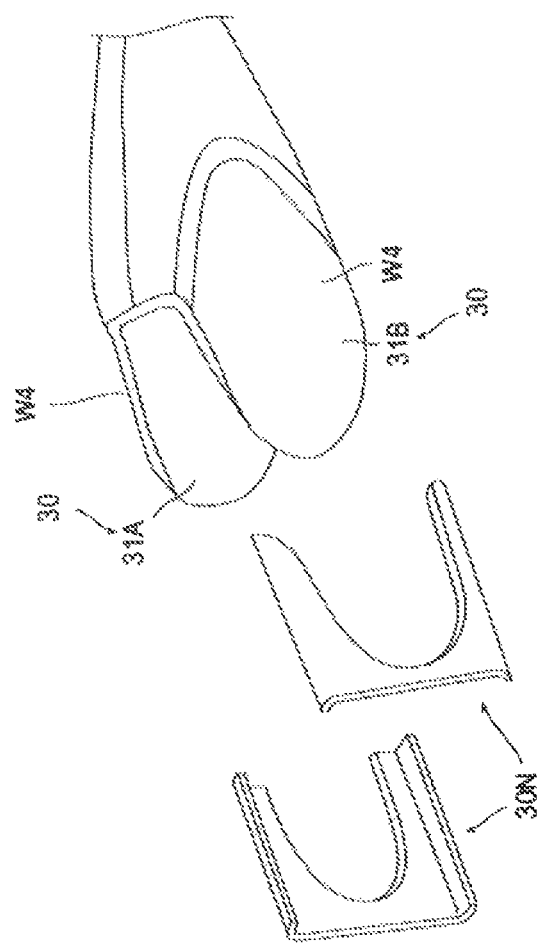
FIG. 16 is a perspective view of a workpiece when a notching process is completed.

FIG. 14 is a cross-sectional view of both ends in the X direction perpendicular to the X axis, illustrating the cutting process of the suspension arm 1 according to the present embodiment. FIG. 16 is a perspective view of the workpiece W when the cutting process is completed.

In the restriking process, as illustrated in FIG. 14, regarding the workpiece W pressed by the seventh forming die 110, after a core N1 formed with a through-hole NH in the Z direction is arranged at an end W4 in the X direction, the parts F1, F2 of the two side portions in the Z direction of the end W4 are cut sequentially by an eighth forming die 120. FIG. 14 illustrates a state in which the part F1 of one of the two side portions of the end W4 in the direction is cut. The eighth forming die 120 includes an eighth upper die 121 provided with cutting blades 123 at a lower portion in the Z direction and an eighth lower die 122 which faces the eighth upper die 121 and is formed with a groove portion 124 into which the workpiece W is fitted. The eighth upper die 121 includes a convex portion 125. The width of the convex portion 125 is formed to be smaller than the width of the through-hole NH of the core N1, enabling cutting without interference with one another.

In the cutting process, first, after the cores N1 are arranged at both ends of the workpiece W in the X direction, the workpiece W is fitted into the groove portion 124 of the eighth lower die 122. Furthermore, when the eighth upper die 121 is moved toward the eighth lower die 122, the cutting blades 123 of the eighth upper die 120 cut the part N1 of one of the two side portions of the end W4 in the Z direction. Thus, the part F1 falls into the through-hole NH of the core N1 as a cut piece. Similarly, the part F2 of one of the two side portions of the end W4 in the Z direction is cut.

Figure 15:
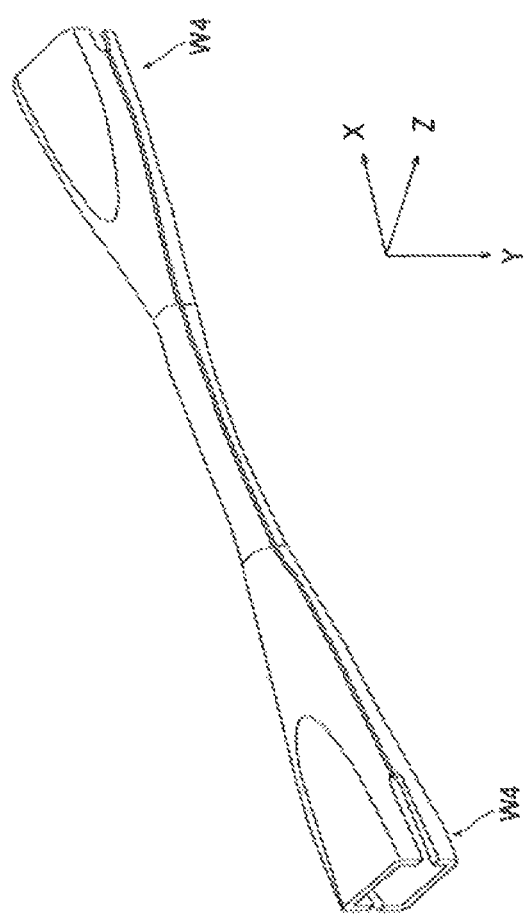
FIG. 15 is a perspective view of a workpiece when the cutting process is completed.

In this way, in the cutting process, as illustrated in FIG. 15, the parts F1, F2 of the two side portions of the end W4 in the S direction formed at both ends in the X direction are cut.

Next, the end W4 from which the parts F1, F2 of the two side portions in the Z direction have been cut is subjected to notching so that two plate portions 30 in the Y direction are formed (notching process).

FIG. 16 is a perspective view of the workpiece W when the notching process is completed. Incidentally, FIG. 16 illustrates only one end of the workpiece W in the X direction.

In the notching process, as illustrated in FIG. 16, one end of the workpiece N in the X direction is subjected to notching with a first notching machine (not illustrated). Thus, unnecessary portions 30N are cut as cut pieces, and two plates 31A, 31S are formed. Similarly, the other end of the workpiece W in the X direction is subjected to notching, and two plates 32A, 32S are formed. The two plates 31A, 31S and the two plates 32A, 32S constitute the two plate portions 30.

Next, the end W4 formed with the two plate portions 30 is subjected to boring so that through-holes 20H are formed through the two plate portions 30 in positions facing one another in the Y direction (boring process).

Figure 17:
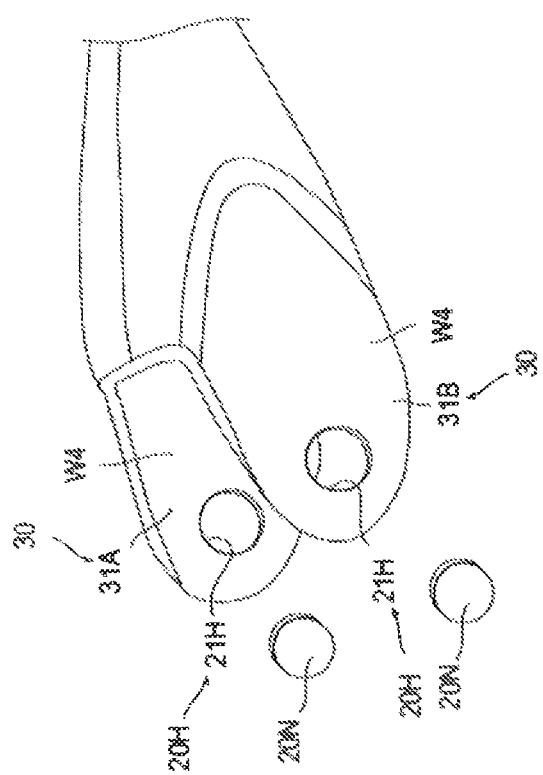
FIG. 17 is a perspective view of a workpiece when a boring process is completed.

FIG. 17 is a perspective view of the workpiece W when the boring process is completed. Incidentally, FIG. 17 illustrates only one end of the workpiece W in the X direction.

In the boring process, as illustrated in FIG. 17, an end of the workpiece W in the X direction is subjected to boring with a boring machine (not illustrated). Thus, unnecessary portions 20N are cut as cut pieces, and through-holes 21H are formed in positions facing one another in the Y direction. More specifically, the through-holes 21H are formed by piercing. Furthermore, the other end of the workpiece W in the X direction is subjected to boring, and through-holes 22H are formed in positions facing one another in the Y direction. More specifically, the through-holes 22H are formed by burring. The through-holes 21H and the through-holes 22H constitute the through-holes 20H.

The suspension arm 1 is manufactured in the processes described above.

Next, the effects of the suspension arm manufactured by the aforementioned manufacturing method are described. In the present embodiment, the workpiece W prior to shaping has a tensile strength of about 590 MPa.

Figure 18A:
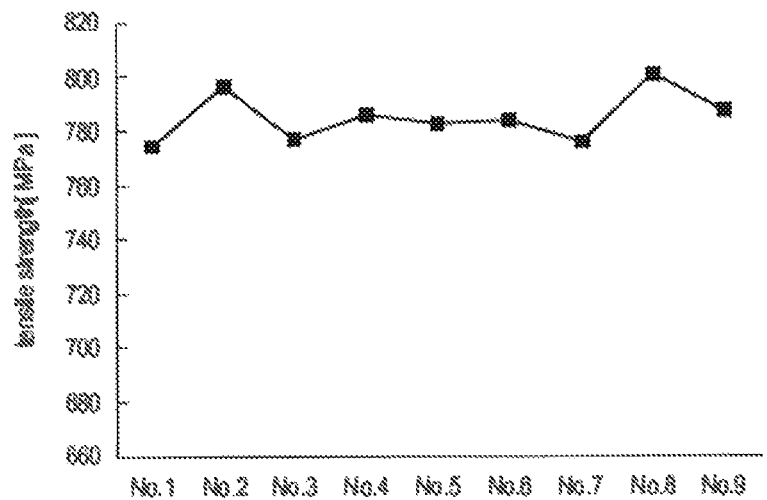
FIG. 18(A) is a graph illustrating a tensile strength of a suspension arm in the circumferential direction.
Figure 18B:
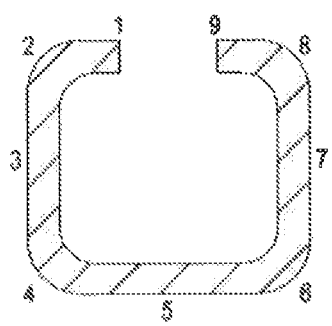
FIG. 18(B) shows the locations indicated in FIG. 18(A).

FIG. 18(A) is a graph illustrating a tensile strength of the suspension arm 1 in the circumferential direction after the pressing from the outer periphery to the inner periphery. Incidentally, the numerical values on the horizontal axis in FIG. 18(A) correspond to the numerical values described in FIG. 18(B). The tensile strengths on the vertical axis in FIG. 18(A) indicate the tensile strengths near the portions indicated by the numerical values of FIG. 18(B).

As illustrated in FIG. 18(A), it can be seen that a tensile strength of 780 MPa or more is obtained in the entire circumferential direction by pressing from the outer periphery to the inner periphery. In other words, the workpiece W, which previously has a tensile strength of 590 MPa, now has a tensile strength of 780 MPa by being subjected to the restriking process. The tensile strength is increased about 32% with respect to the natural tensile strength of the material.

As described above, the method of manufacturing the suspension arm 1 according to the present embodiment is a method of manufacturing a suspension arm 1 having a hollow shape an open cross-section by subjecting the workpiece W, which is a flat plate, extending in the XY plane to pressing in stages such that the two side surfaces W1, W2 of the workpiece W in the XZ plane face one another across the gap G. The method of manufacturing the suspension arm 1 includes the restriking process in which the protrusion 113 disposed on the seventh forming die 110 to be extended in the X direction is arranged in the gap G between the two side surfaces W1, W2 facing one another and the two side surfaces W1, W2 are brought into contact with the protrusion 113 such that the workpiece W is pressed from the outer periphery to the inner periphery. In this manufacturing method, since the suspension arm 1 has a hollow shape in open cross-section, the torsional rigidity can be reduced to a predetermined level or less. Furthermore, since the protrusion 113 is arranged in the gap G between the two side surfaces W1, W2 and the two side surfaces W1, W2 are brought into contact with the protrusion 113 such that the workpiece W is pressed from the outer periphery to the inner periphery, a compression load can be uniformly applied to the workpiece W in the circumferential direction. Thus, the material is compressed in the circumferential direction, and work hardening uniformly occurs in the circumferential direction. Thus, a tensile strength equal to or greater than the tensile strength of the material can be obtained in the entire circumferential direction. Thus, the tensile strength can be increased without an increase in material thickness. Accordingly, the suspension arm 1 which has a torsional rigidity of a predetermined level or less and has an increased tensile strength without an increased material thickness can be provided.

Furthermore, in the restriking process, the protrusion 113, which is formed to have a distance equal to or greater than the distance of the X-directional gap G extending in the X direction, is arranged in the gap G, followed by pressing. Thus, a hollow shape in open cross-section from one end to the other end in the X direction is formed. Accordingly, the material to be used can be reduced, enabling a reduction in cost.

Furthermore, the processes prior to the restriking process include the forming process in which, in the YZ plane, the workpiece W, which a flat plate, is pressed such that the base portion B with a predetermined width is remained near the middle in the Y direction, the pair of first extensions E1 which are extended downward in the Z direction away from one another from both ends of the base portion B, the pair of second extensions E2 which are extended upward in the direction away from one another from the ends of the first extensions E1 opposite to the ends where the base portion B is disposed, and the pair of flange portions T which are extended outward in the Y direction away from one another from the ends of the second extensions E2 opposite to the ends where the first extensions E1 are disposed are formed, the preliminary process in which the second extensions E2 are bent in the direction in which the first extensions E1 are extended and the flange portions T are bent downward in the Z direction, and the bending process in which the second extensions E2 are bent to be substantially parallel to the first extensions E1 and the first extensions E1 and the second extensions E2 are bent downward in the Z direction so that the flange portions T face one another. In this manufacturing method, the two side surfaces W1, W2 originally face one another when the two side surfaces W1, W2 contact the protrusion 113 in the restriking process. Therefore, the two side surfaces W1, W2 are brought into surface contact with the protrusion 113. Thus, the protrusion 113 and the two side surfaces W1, W2 are unlikely to be damaged. Furthermore, in this manufacturing method, since the second extensions E2 are bent in the direction opposite to the direction in which the first extensions E1 are extended in the Z direction, the material is easily deformed, facilitating pressing after the preliminary process.

Furthermore, in the bending process, the first extensions E1 and the second extensions E2 are subjected to pressing multiple times such that the first extensions E1 and the second extensions E2 are bent downward in the Z direction. Therefore, a stress generated during manufacturing is low, increasing safety.

Furthermore, the two plate portions 30 coupling the wheel or the shaft member are formed in one piece. Therefore, manufacturing from one plate material is enabled, which reduces the manufacturing costs and the manufacturing time.

Incidentally, the present invention is not limited to the aforementioned embodiment, but various modifications can be made within the scope of the claims.

For example, in the aforementioned embodiment, in the forming process, the second extensions E2 are bent in the direction opposite to the direction in which the first extensions E1 are extended in the Z direction, and after the flange portions 30 are formed, the two side surfaces W1, W2 are pressed to face one another. However, the process may be performed such that a flat plate is simply subjected to pressing in stages so that the two side surfaces W1, W2 face one another without the forming process.

Furthermore, although the bending process includes the three processes: the first bending process, the second bending process, and the third bending process, the bending process is not limited to the above, but may include one process, two processes, or four processes or more.

Furthermore, in the present embodiment, the present invention is used as the suspension arm 1. However, the present invention may be similarly applied even to any vehicular components with a long arm shape such as a clutch pedal arm, a radius rod, and a trailing arm.

REFERENCE SIGNS LIST

1: suspension arm
110: seventh forming die (restriking die)
113: protrusion
B: base portion
E1: first extension
E2: second extension
T: flange portion
G: gap
W: workpiece
W1, W2: two side surfaces
W4: end

The invention claimed is:

1. A method of manufacturing a vehicular arm component, said vehicular arm component having a hollow shape in open cross-section, comprising:
  subjecting a workpiece, which is a flat plate, extending in a first plane formed by a first direction and a second direction perpendicular to the first direction to pressing in stages such that two side surfaces of the workpiece in a second plane formed by the first direction and a third direction perpendicular to the first plane face one another across a gap; and
  restriking the workpiece with a protrusion disposed on a restriking die, said protrusion being arranged in the gap between the two side surfaces facing one another and wherein the two side surfaces are brought into contact with a side surface of the protrusion in an orthogonal direction such that the workpiece is pressed from an outer periphery to an inner periphery;
  wherein the pressing comprises:
  a forming process in which, in a third plane formed by the second direction and the third direction, the workpiece, which is the flat plate, is pressed such that, while a base portion of the flat plate with a predetermined width is held and is left unformed, a pair of first extensions extended in the third direction away from first and second ends of the base portion, a pair of second extensions extended in a direction opposite to the direction in which the first extensions are extended in the third direction, away from one another, from ends of the first extensions opposite to the first and second ends of the base portion, and a pair of flange portions extended outward in the second direction away from one another from ends of the second extensions opposite to the ends of the first extensions are formed, and wherein the method comprises, between the pressing and the restriking:
  a preliminary process in which the second extensions are bent in the direction in which the first extensions are extended and the flange portions are bent in the third direction, and
  a bending process in which the second extensions are bent to be substantially parallel to the first extensions, and the first extensions and the second extensions are bent in the third direction such that the flange portions face one another.

2. The method of manufacturing the vehicular arm component according to claim 1, wherein the protrusion is formed to have a distance equal to or greater than a distance of the gap in the first direction, and is arranged in the gap.

3. A vehicular arm component manufactured by the method of manufacturing the vehicular arm component according to claim 2.

4. The method of manufacturing the vehicular arm component according to claim 1, wherein, in the bending process, the first extensions and the second extensions are subjected to pressing multiple times such that the first extensions and the second extensions are bent in the third direction.

5. A vehicular arm component manufactured by the method of manufacturing the vehicular arm component according to claim 4.

6. A vehicular arm component manufactured by the method of manufacturing the vehicular arm component according to claim 1.

* * * * *